United States Patent [19]

Okawa et al.

[11] Patent Number: 4,525,160
[45] Date of Patent: Jun. 25, 1985

[54] ENDLESS BELT MEMBER FOR A CONTINUOUSLY VARIABLE TRANSMISSION

[75] Inventors: Susumu Okawa, Numazu; Hideaki Matsui, Gotenba; Yasunobu Jufuku; Toshimi Kato, both of Susono, all of Japan

[73] Assignee: Toyota Jidosha Kabushiki Kaisha, Japan

[21] Appl. No.: 579,968

[22] Filed: Feb. 14, 1984

[30] Foreign Application Priority Data

Apr. 14, 1983 [JP] Japan .................. 58-66505

[51] Int. Cl.³ .............................. F16G 5/18
[52] U.S. Cl. .................... 474/242; 474/272; 474/201
[58] Field of Search ............ 474/242, 244, 246, 247, 474/253, 272, 201, 265

[56] References Cited

U.S. PATENT DOCUMENTS

| 3,949,621 | 4/1976 | Beusink et al. ................. 474/201 |
| 4,080,841 | 3/1978 | Vollers ............................... 474/201 |
| 4,299,586 | 11/1981 | Van der Hardt Aberson .... 474/201 |

FOREIGN PATENT DOCUMENTS

| 0014492 | 1/1980 | European Pat. Off. . |
| 252848 | 3/1911 | Fed. Rep. of Germany . |
| 1960350 | 6/1971 | Fed. Rep. of Germany ...... 474/242 |
| 2242608 | 3/1975 | France . |
| 2327452 | 5/1977 | France . |
| 5582455 | 1/1982 | Japan .................. 474/201 |
| 5596997 | 2/1982 | Japan .................. 474/201 |
| 256918 | 9/1948 | U.S.S.R. ............... 474/201 |

OTHER PUBLICATIONS

Japanese Laid Open Patent Publication Sho 55-100443, dated Jul. 31, 1980.
Japanese Laid Open Patent Publication Sho 55-107147, dated Aug. 16, 1980.

Primary Examiner—Stephen J. Novosad
Assistant Examiner—Thuy M. Bui
Attorney, Agent, or Firm—Parkhurst & Oliff

[57] ABSTRACT

A continuously variable transmission means having block members, each block member having longitudinal projections causing the rotating radius of the block members to be the same as the rotating radius of an endless carrier, the block members and endless carrier forming a belt which extends between a driving pulley and a driven pulley. When a portion of the belt is in a transition area between a straight extension between the pulleys and moving toward contacting a peripheral portion on one of the pulley, the sliding movement between adjacent block members and the carrier is obviated due to the rotating radius of the block members being equivalent to the radius of the carrier.

7 Claims, 7 Drawing Figures

RATIO OF THE REVOLUTION NUMBER RPMout
OF THE DRIVEN PULLEY TO THE REVOLUTION
NUMBER RPMin OF THE DRIVING PULLEY

ENDLESS BELT MEMBER FOR A CONTINUOUSLY VARIABLE TRANSMISSION

BACKGROUND OF THE INVENTION

The present invention relates to a continuously variable transmission means for transmitting torque from a driving pulley to a driven pulley, both the driving and driven pulleys have contact surface cross-sections which are V-shaped.

A continuously variable transmission (CVT) comprises a V-belt extending between a driving and a driven pulley, the ratio capable of being varied (ratio being defined as the RPM or speed ratio between the driven and driving pulleys), by adjusting the size of a V-shaped opening(s) in one or both of the pulleys or by varying the pressure which forces the belt into the opening(s). Thus, the position of the belt on the pulleys and the effective diameter of the pulleys can be varied, which makes it possible to continuously vary the ratio between the driven pulley and the driving pulley.

Prior techniques for forming a belt member for a continuously variable transmission include using a predetermined number of metallic hoops upon which longitudinally shiftable V-shaped block members are mounted, the V-shaped block members are linked together and extend around the total circumference of the hoops. The driving force from the driving pulley is then transmitted to the driven pulley by a movement of the V-shaped block members. The block members transmit the driving force to adjacent blocks toward the driven pulley. Thus, the block members gradually transmit the force of the driving pulley to the driven pulley, at points where the block members are in contact with the driven pulley.

A known continuously variable transmission has block members which engage with adjacent block member and move in a straight relationship with each other when in a straight extension area between the driving and driven pulleys. However, when the block members are displaced from the straight extension area and contact a point around a peripheral portion of one of the pulleys, a block member contacts an adjacent block member at a position located at an inner radial point, rather than at a position where the endless carrier engages with the block members. Hence, the rotating radius of the endless carrier is larger than the rotating radius of the block members, where the block members have a rotating radius defined as the radius of the combined circular arc formed between block members adjacently contacting each other. The block members can move relative to each other because the block members contact adjacent block members at different points. This sliding movement results in friction between the endless carrier and the block members and therefore consumes some part of the driving force from the driving pulleys as friction. This impairs the efficiency of the continuously variable transmission.

SUMMARY OF THE INVENTION

The present invention was made in view of the foregoing background and to overcome the foregoing drawbacks. An object of this invention is to provide a belt member for a continuously variable transmission means which decreases the sliding movement between the block members and the endless carrier, thereby increasing the efficiency of the torque transmitted from the driving pulley to the driven pulley.

To attain the above objects, a continuously variable transmission means, according to the present invention, has an endless carrier comprising a plurality of metallic hoops superimposed on each other and a plurality of V-shaped, block members which are longitudinally shiftable along the metallic hoops. Each V-shaped block member has a projection at one surface thereof and a complementary recess located on a surface oppositely positioned to the surface having the projection. In this construction, when the block members are positioned around one of the pulleys, the projection of each block member engages with the complementary recess of an adjacent block member, the engaged point having substantially the same radius as that of the endless carrier. Hence, when the block members are guided by the hoops, the sliding movement is reduced between the carrier and the upper surface of the block member which results in a lesser degree of contact with the carrier.

BRIEF DESCRIPTION OF THE DRAWINGS

The above objects, features and advantages of the present invention will become more apparent from the following description of the preferred embodiments taken in conjunction with the accompanying drawings, wherein.

DETAILED DESCRIPTION OF THE PREFERRED EMBODIMENT

The present invention is described in detail with reference to the accompanying drawings which illustrate different embodiments of the present invention.

Figure 1:
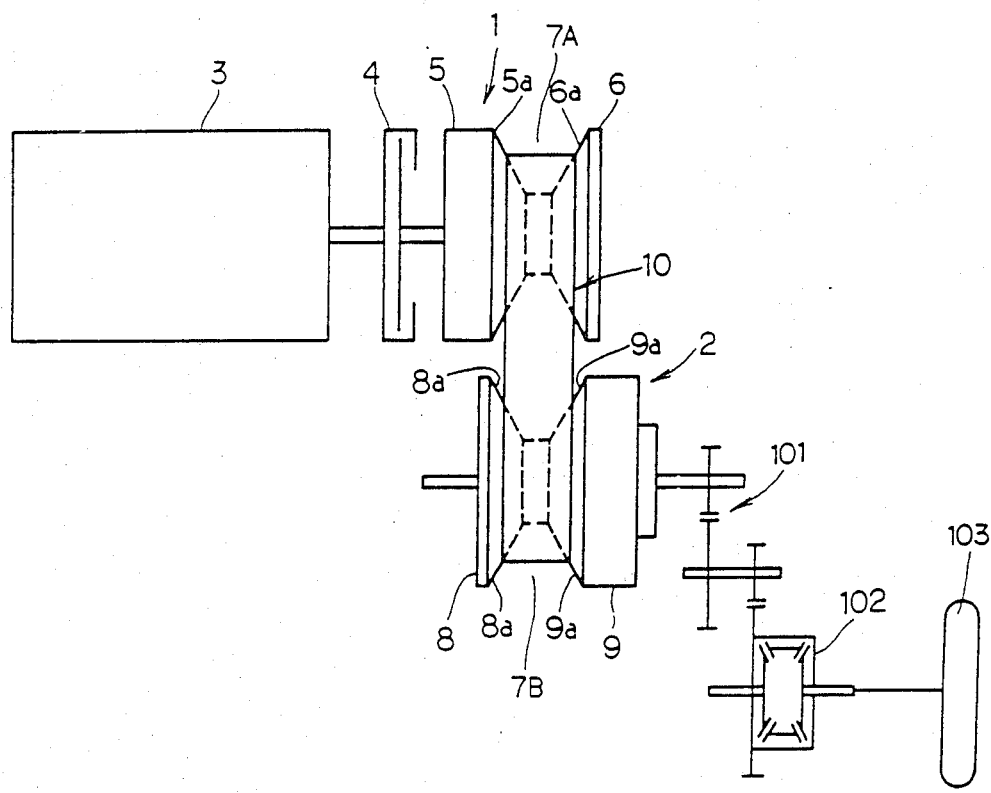
FIG. 1 is a schematic view of an apparatus employing a continuously variable transmission according to the present invention.

Referring now to the drawings, wherein same reference characters designate corresponding parts throughout several views, FIG. 1 shows a schematic view of a driving mechanism in which the present invention is applied. An output shaft of a power source 3, such as an engine, connects with a driving member of a clutch 4. A driven member of the clutch 4 connects with an input shaft of a continuously variable transmission. The driving force of the power source 3 is transmitted through the clutch 4 to the continuously variable transmission. The transmission includes a V-shaped belt pulley 1 coaxially provided to the clutch 4, and a V-shaped belt pulley 2 being provided in a parallel relationship with the driving pulley 1. The driving pulley 1 has a movable portion 5 actuated by a hydraulic actuator, and a fixed portion 6. A V-shaped circumferential groove 7A is formed in a portion between the movable portion 5 and the fixed portion 6. The references 5a and 6a designate driving faces on the pulleys 5 and 6, respectively, upon which the V-shaped belt 10 contacts.

The driven pulley 2 comprises a fixed portion 8 and a movable portion 9, which is actuated by a hydraulic actuator. A V-shaped circumferenital groove 7B is formed in a portion between the fixed portion 8 and the movable portion 9. The references 8a and 9a designate following faces on the pulleys 8 and 9, respectively, upon which the V-shaped belt 10 contacts. A driving belt 10 fits in the V-shaped grooves 7A and 7B to transmit the torque of the driving pulley 1 to the driven pulley 2. An output shaft of the driven pulley 2 connects through a gear train 101 with a final driving gear 102, whose output is transmitted to tires 103.

The width of the pulleys 1 and 2 change due to a hydraulic actuator means, whereby the torque from a power source 3 is transmitted while being continuously varied by the continuously variable transmission.

Figure 2:
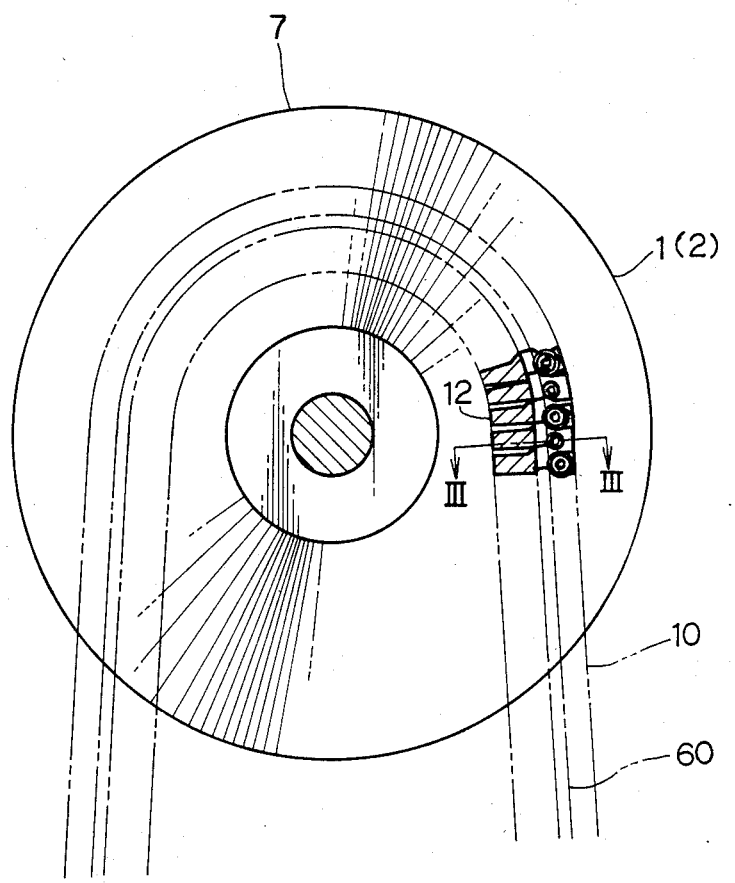
FIG. 2 is a longitudinal cross-sectional view of part of a continuously variable transmission, showing the belt means extending around one of the pulleys.

FIG. 2 shows a longitudinal cross-sectional view of part of a continuously variable transmission, showing the belt means extending around one of the pulleys. The endless driving belt 10 comprises an endless metallic carrier 60 and a plurality of metallic blocks 12 which are longitudinally, shiftably mounted on the metallic carrier 60. The metallic carrier 60 comprises a plurality of superimposed metallic hoops which form a loop shape.

Figure 3:
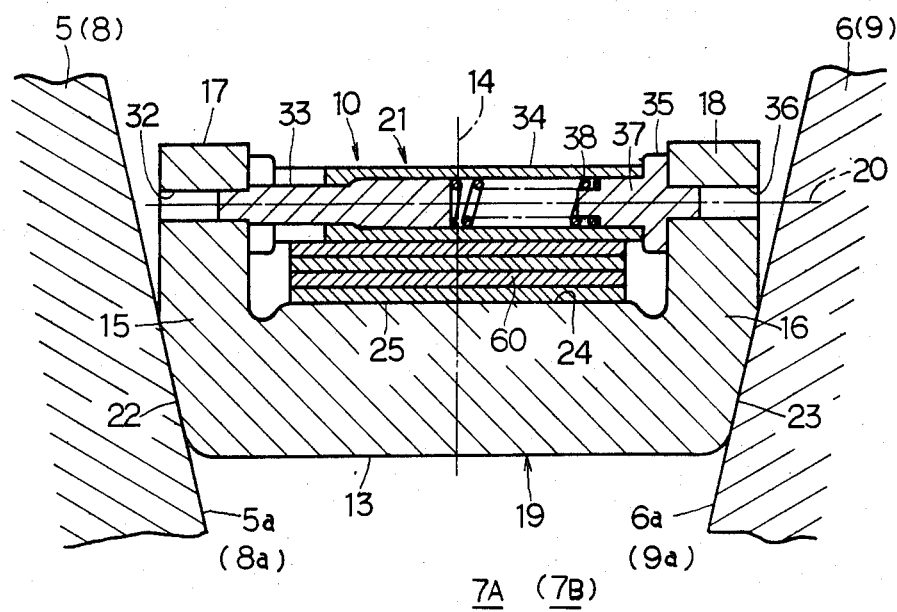
FIG. 3 is an enlarged cross-sectional view taken along the line III—III of FIG. 2.
Figure 4:
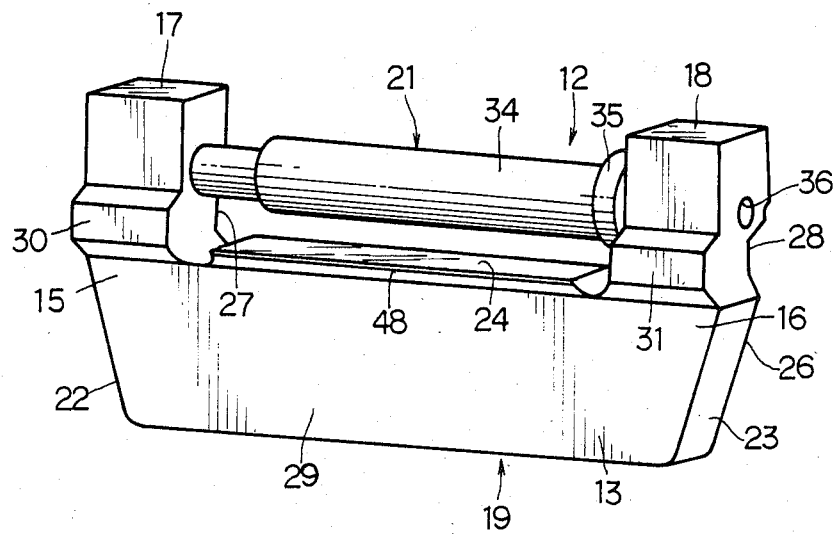
FIG. 4 is a perspective view showning one of the block members employed in the continuously variable transmission means according to the present invention.

A plurality of the metallic blocks 12 link up and extend around the total circumference of the metallic carrier 60. FIGS. 3 and 4 show that the block 12 comprises a block body 19 and a guide roller 21. The block body 19 has a plate portion 13, the plate portion 13 having the shape of an overturned isoceles trapezoid, and a pair of column portions 17 and 18 integrally formed with the plate portion 13 and projecting upward from lateral ends 15 and 16 of the plate portion 13. The guide roller 21 extends between the column portions 17 and 18, and is mounted on the column portions 17 and 18 so that the guide roller 21 rotates around an axis 20, which is perpendicular to an axis 14.

The block body 19 has side end faces 22 and 23 which are inclined at substantially the same angle relative to the axis 14. The block body 19 contacts the faces 5a (8a) and 6a (9a) of pulleys 5 (8) and 6 (9) at the side end faces 22 and 23 of the block body 19. The block body 19 has a radially outward end surface 24, upon which the endless carrier 60 lies and frictionally engages with. Further, the column portions 17 and 18 have a pair of recesses 27 and 28 respectively, which are provided in the vicinity of the point connecting the plate portion 13 with the column portions 17 and 18, and located on a rear side 26 of the block body 19. The recesses 27 and 28 extend in a substantially parallel manner to the axis 20. Additionally, the block body 19 has a front face 29.

A pair of projections 30 and 31 are provided on the front surface 29 of the block body 19. The projections 30 and 31 are located so that they fit into the recesses 27 and 28, respectively, of an adjacently located block body. The projections 30 and 31 also extend in a substantially parallel manner to the axis 20.

The guide roller 21 comprises pins 33 and 37, a cylindrical member 34 and a compression coil spring 38. The first pin 33 fits into a hole 32 provided within the column portion 17 at one end thereof, and the other end of the pin 33 is received in a hole within the cylindrical member 34. The second pin 37 has a flange 35 at a central portion thereof, and one end of the second pin 37 fits into a hole 36 provided within the column portion 18, in a manner which allows the second pin 37 to rotate within the hole 36, and a second end of the second pin 37 is pressure fitted into the hole within the cylindrical member 34. The compression coil spring 38 is within the cylindrical member 34, and extends between the pins 33 and 37. A space is formed between an outermost peripheral portion of a cylindrical member 34 of the guide roller 21 and the radially outward end surface 24 of the block body 19. The endless carrier 60 extends through the space between the cylindrical member 34 and the end surface 24. FIG. 2 shows that each guide roller 21 is mounted on a block body 19 so that the longitudinal axis 20 of each adjacent guide roller 21 alternately points in opposite longitudinal directions.

Figure 5:
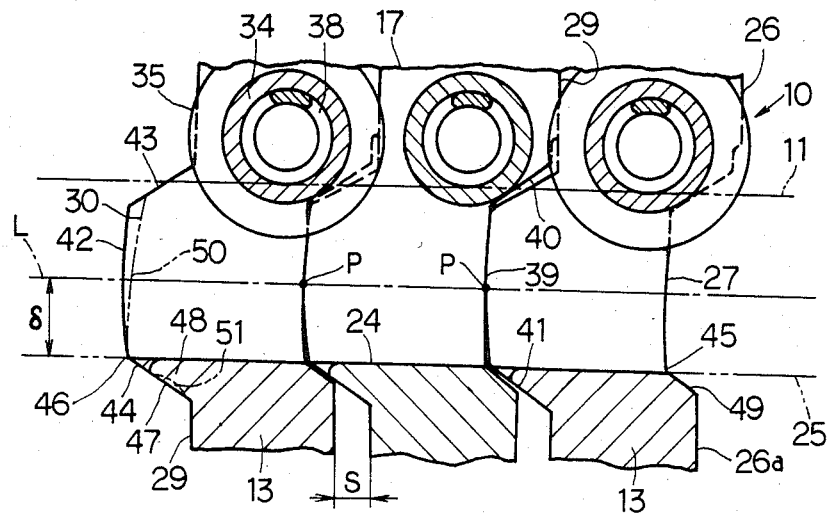
FIG. 5 is an enlarged partial cross-sectional view of the relative positions of block members extending along the straight line area between the pulleys.
Figure 6:
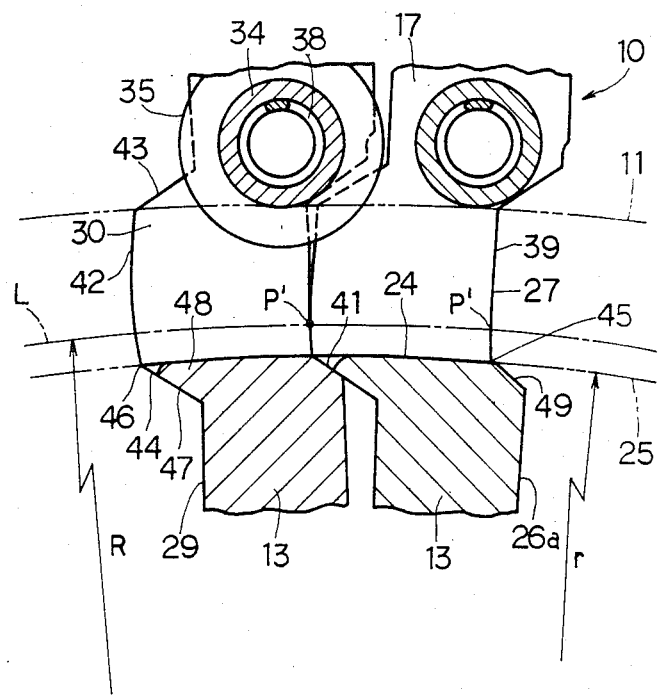
FIG. 6 is an enlarged partial cross-sectional view of the relative positions of block members extending around one of the pulleys.

FIGS. 5 and 6 further disclose that the recesses 27 and 28 of the block 12 comprise a base surface 39 extending in a parallel relationship with a front surface 42 of the projections 30 and 31; an inclined surface 40 radially extending outward from the base surface 39; and an inclined surface 41 extending radially inward from the base surface 39. The projections 30 and 31 on the block 12 project in a forward direction and comprise the front surface 42 and the inclined portions 43 and 44 extend radially outward and radially inward, respectively, from the front surface 42. The base surface 39 of the recesses 27 and 28 interconnects with the inclined surface 41 at a point 45. The front surface 42 of the projections 30 and 31 interconnects with the inclined portion 44 at a line 46. The interconnecting point 45 and the line 46 lie in the same horizontal plane as the radially outward end surface 24 of the block body 19.

FIG. 5 shows the front surface 42 of the projections 30 and 31 engages with the base surface 39 of the recesses 27 and 28 at a central line when the belt 10 is in a straight extension area between the driving pulley 1 and the driven pulley 2. However, when the belt 10 contacts points around the peripheral portion of either of the pulleys 1 or 2, the portion of the recesses 27 and 28 formed between the interconnecting point 45 and the contact line P contacts with the portion extending between the line 46 formed on the projections 30 and 31 of the adjacent block and the contact line P, at the line P'.

In the embodiment shown in FIG. 5, when the belt 10 is in a straight extension area between the pulleys 1 and 2, each block 12 contacts an adjacent block at the surface between the rear surface 26 and the front surface 29 of the column portions 17 and 18.

Each block 12 has an inclined surface 47, which is inclined at the same angle as the inclined surface 41 of the recesses 27 and 28. The inclined surface 47 projects forward along the axis 20 to form an overhang portion 48. Further, each block 12 has an inclined surface 49 for allowing the overhang portion 48 to contact thereon. The thickness of the plate portion 13 of each block 12 is designed to be smaller than that of the column portions 17 and 18, thereby providing for a distance S between the front surface 29 of each block and the rear side face 26a on an adjacent block whenever the belt 10 extends between the pulleys. The value of distance S determines the amount of interference occurring between the front surface 29 and the rear side face 26a of an adjacent block.

In operation, when the belt 10 is positioned around a peripheral portion of either of the pulleys, the front surface 42 of the projections 30 and 31 of each block 12 contacts with the base surface 39 of the recesses 27 and 28 of an adjacent block, at a position which is substantially at a same radial point as that of the upper end surface 24 of the block body 19. Hence, as the rotating radius "r" of an inner surface 25 of the carrier 11 becomes substantially similar to the radius "R" of a pitch circle of the blocks 12, a reduction in the relative sliding movement generated between the radially outward end surface 24 of each block 12 and the radially inward surface 25 of the endless carrier 11.

In accordance with known techniques, when the belt 10 is in a transition area between the straight extension and moving toward contacting the peripheral portion of one of the pulleys, a block 12 rotates relative to an adjacent block around the line 46 of the projections 30 and 31 or in the vicinity of the line 46. This results in a separate movement of the inner surface 25 of the carrier 11 from the radially outward end surface 24 of each block 12.

In accordance with the present invention, the relative movement between the radially outward end surface 24 of each block 12 and the inner surface 25 of the carrier 11 is obviated.

Figure 7:
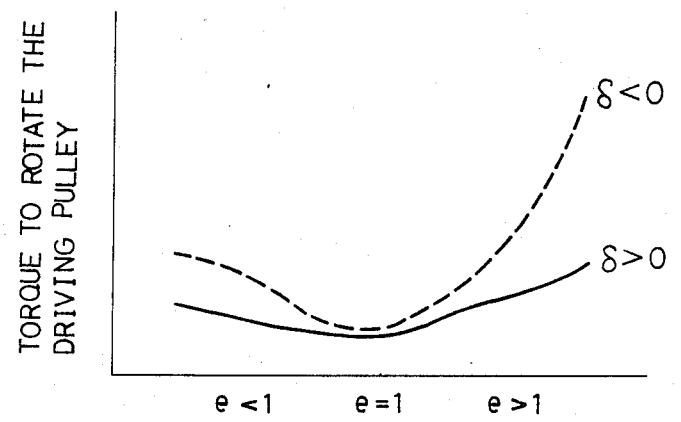
FIG. 7 is a graph shownning the relationship between the requisite transmitting torque and the ratio "e", "e" being defined as the ratio between the revolution number of the driven pulley and the revolution number of the driving pulley.

FIG. 7 shownns a graph illustrating the relationship between the torque needed to rotate an input pulley (the driving pulley), which is subjected to a predetermined load through the driven pulley, and the ratio between the revolution number ($RPM_{out}$) of the driven pulley to the revolution number ($RPM_{in}$) of the driving pulley (i.e. ($RPM_{out}$)/($RPM_{in}$)="e"). The reference $\delta$ in FIG. 7 designates the distance between a contact line L and the radially outward end surface 24 of each block as shown in FIGS. 5 and 6.

The contact line L is formed by linking a plurality of contact lines P, which are formed by the front surface 42 of the projections 30 and 31 contacting the base surface 39 of the recesses 27 and 28. The reference "$\delta > 0$" refers to the occurrence of the contact line L being located radially further outward than the radially outward end surface 24, as shown in FIGS. 5 and 6. The reference "$\delta > 0$" refers to the occurrence of the contact line L being located radially further inward than the radially outward end surface 24.

It is apparent from FIG. 7 that according to prior art ($\delta < 0$), the torque needed to rotate an input pulley (the driving pulley) increases as a function of an increase in the difference between the revolution number of the input pulley and the output pulley, created by the sliding movement between the block members and the endless carrier. However, according to the present invention ($\delta > 0$) the torque needed to rotate an input pulley (the driving pulley) is maintained at a small value, even when the difference between the revolution number of the input pulley and the output pulley increases.

The front surface 42 of the projections 30 and 31 may be of the form indicated by the two dot-chain line 50 shown in FIG. 5, provided that the edge line 46 of the front surface 42 of each block contacts with the line 45 of the adjacent block. The projections 30 and 31 may have inclined surfaces 44 and 47, respectively, as indicated by a two dot-chain line 51 in FIG. 5, to ensure that no interference occurs between the inclined portions 44 and 49.

While the present invention has been described in its preferred embodiments, it is to be understood that the invention is not limited thereto, and may be otherwise embodied within the scope of the following claims.

What is claimed is:

1. A continuously variable transmission means for transmitting torque between a V-shaped driving pulley and a V-shaped driven pulley, comprising:
   an endless carrier consisting of a plurality of metallic hoops extending between and contacted around peripheral portions of said driving and driven pulleys, the endless carrier assuming a radius when contacted around said peripheral portions; and
   a plurality of V-shaped block members being longitudinally shiftable along the metallic hoops, the block members being linked together and extending around the total circumference of the metallic hoops, each block member having at least one longitudinal projection on a first surface, and at least one longitudinal recess complementary to the projection on a second surface, the second surface being located longitudinally opposite to the first surface, whereby the longitudinal projection on each V-shaped block member engages with the longitudinal recess of an adjacent block member at a point having a radius which is substantially similar to the radius of the endless carrier when said endless carrier contacts a peripheral portion of one V-shaped pulley.

2. The continuously variable transmission of claim 1, wherein the V-shaped block member comprises:
   a plate portion having a radially outward surface;
   a first column portion radially outwardly extending from a first lateral end of the plate portion and a second column portion radially outwardly extending from a second lateral end of the plate portion; and
   a guide roller extending between the column portions for holding the metallic hoops in a position between the guide roller and the radially outward surface of the plate portion, the guide roller and the radially outward surface being provided in a substantially parallel relationship to each other.

3. The continuously variable transmission of claim 2, wherein a first longitudinal projection is provided on the first column portion and a second longitudinal projection is provided on the second column portion, and a first complementary longitudinal recess is provided on a longitudinally opposite surface from said first longitudinal projection and a second complementary longitudinal recess is provided on a longitudinally opposite surface from said second longitudinal projection.

4. The continuously variable transmission of claim 2, wherein an upper portion of said first and second column portions of the V-shaped block members contacts an upper portion an adjacent first and second column portion of an adjacent V-shaped block member, when the V-shaped block members extend between the driving pulley and the driven pulley.

5. The continuously variable transmission of claim 1, wherein said longitudinal projection comprises a first radially outward inclined surface, a second radially inward inclined surface, and a front surface connecting between a radially innermost point on said radially outward inclined surface and a radially outermost point on said radially inward inclined surface.

6. The continuously variable transmission of claim 5, wherein the front surface of said longitudinal projection is inclined.

7. The continuously variable transmission of claim 5, wherein a space is provided between an upper portion of the front surface of the plate portion of one V-shaped block member and an upper portion of a rear surface of the plate portion of a longitudinally forward positioned V-shaped block member.

* * * * *